Oct. 27, 1936.  T. C. DELAVAL-CROW  2,058,572
INDUSTRIAL POWER UNIT
Filed May 27, 1935    2 Sheets-Sheet 1

Inventor
Thomas C. Delaval-Crow

By Blackmore, Spencer & Flint
Attorneys

Oct. 27, 1936.    T. C. DELAVAL-CROW    2,058,572
INDUSTRIAL POWER UNIT
Filed May 27, 1935    2 Sheets-Sheet 2

Inventor
Thomas C. Delaval-Crow
By Blackmore, Spencer & Hiird
Attorneys

Patented Oct. 27, 1936

2,058,572

UNITED STATES PATENT OFFICE 2,058,572

INDUSTRIAL POWER UNIT

Thomas C. Delaval-Crow, Bristol, Conn., assignor to General Motors Corporation, Detroit, Mich., a corporation of Delaware Application May 27, 1935, Serial No. 23,661

1 Claim. (Cl. 172—36)

This invention relates to an industrial power unit including a motor and a ratio-changing mechanism.

Its object is to effect a cooling of the combined unit.

A further object is to provide for cooling of the combined motor and change speed mechanism by an air current produced by a fan rotating at the most advantageous rate.

Other objects and advantages will be understood from the following description.

Figure 1:
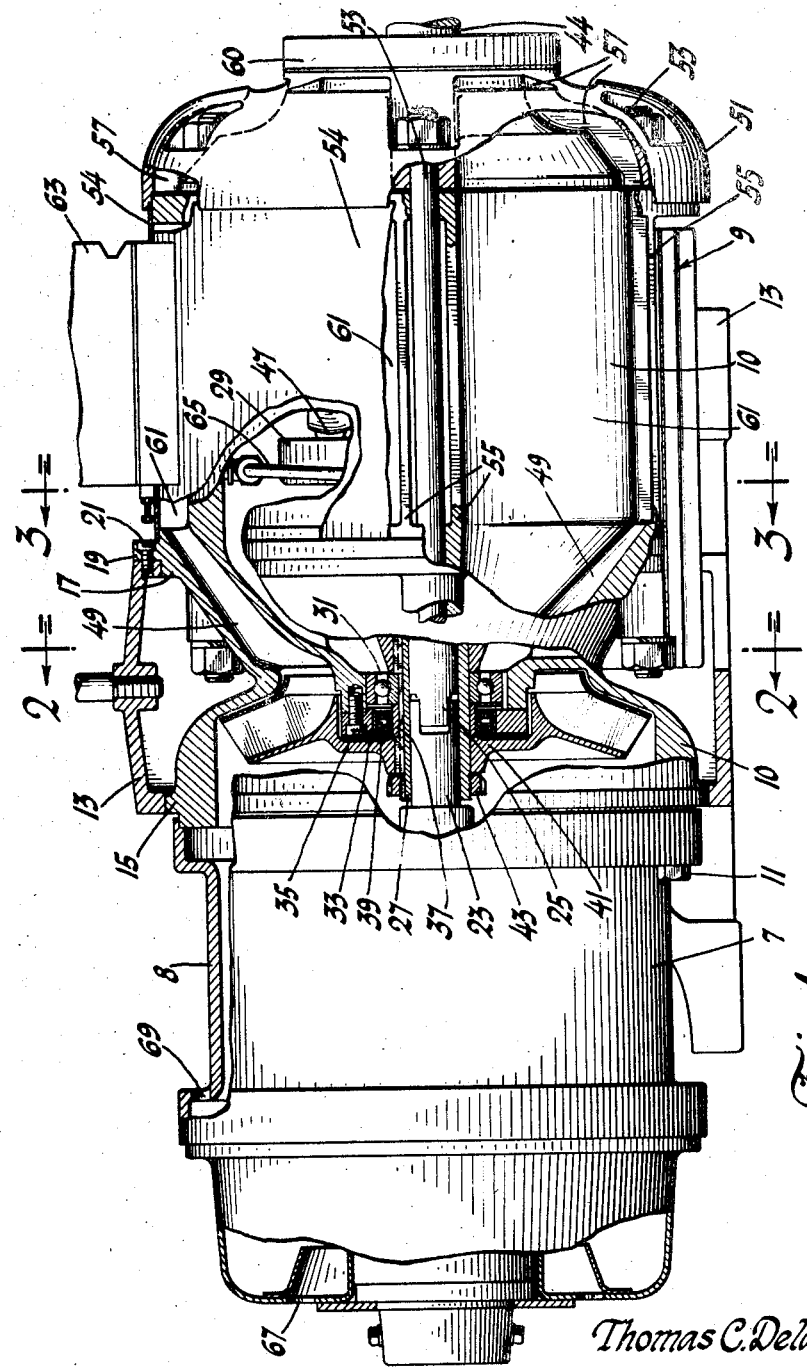
Fig. 1 is a view in side elevation, partly broken away and in section.
Figure 2:
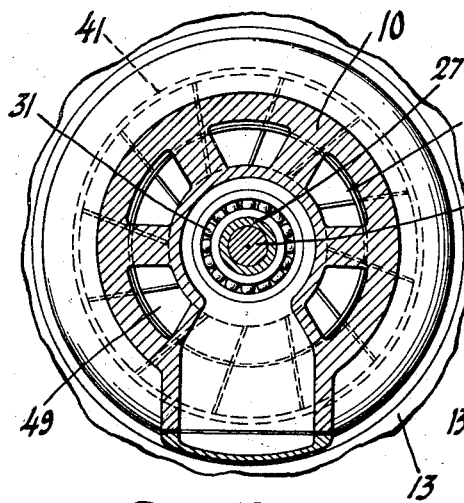
Fig. 2 is a section on line 2—2 of Fig. 1.

The drawings show a motor 7 having a surrounding wall 8 and associated therewith a variable speed transmission designated as a whole by numeral 9. The two parts are secured together by fastening means 11 and the combined units are supported by a leg 13 encompassing flanges 15 and 17 on the change speed casting 10 and attached to a flange 19 thereof by fastening means 21. Numeral 23 is the motor shaft and 25 is an extension shaft rotatable therewith. Surrounding shafts 23 and 25 is a sleeve 27 rotatable with these aligned shafts and operable by means, not shown, to rotate an input race 29 of a variable speed transmission. Sleeve 27 is journaled in the casting 10 by antifriction bearings 31. A ring 33 is secured to the casting by fastening means 35 and between the ring and a spacer 37 is packing means 39. The hub of a fan 41 is keyed to the sleeve and clamped in position by a threaded nut 43. By this arrangement the fan rotates with the motor shaft.

Figure 3:
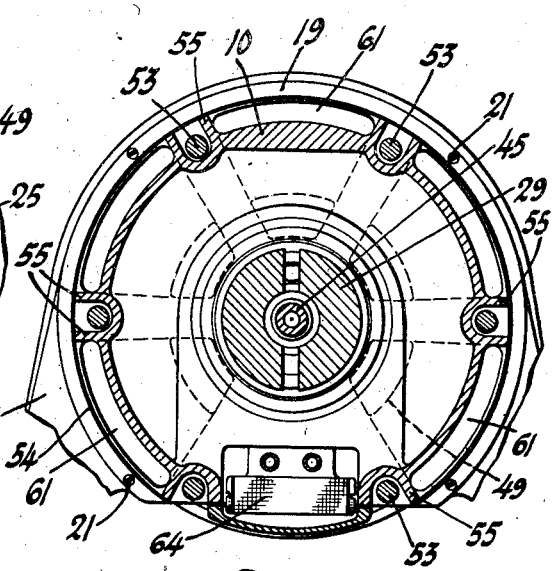
Fig. 3 is a section on line 3—3 of Fig. 1.
Figure 4:
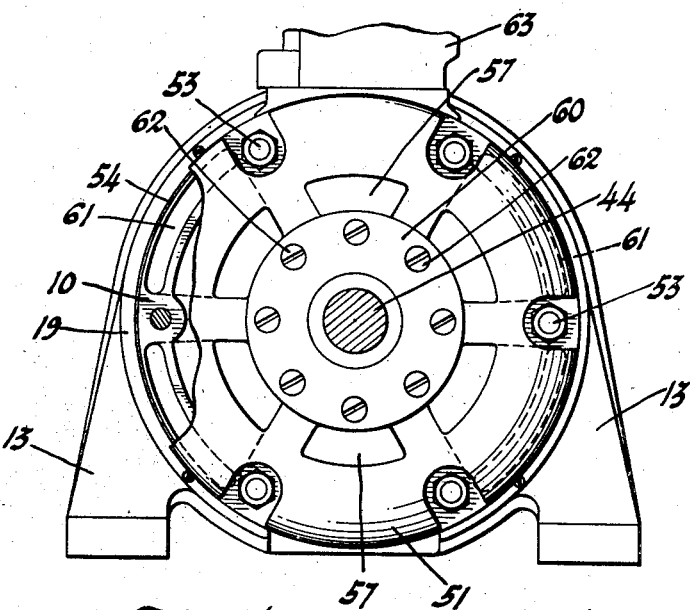
Fig. 4 is a view in end elevation from the right end of Fig. 1.

Driving race 29 surrounds the driven shaft 44, a reduced forward end of which is marked 45 in Fig. 3. It rotates a driven race, not shown, by means of rollers, one of which is marked 47. The transmission details are not, per se, a part of this invention and have not been illustrated more than as described. The casting 10 is formed with a plurality of passages 49 having axial and radial components and extending from a position adjacent the periphery of the casting to a position adjacent the fan as shown by Fig. 1. To the end of the casting 10 remote from the motor is a cover 51 secured by fastening means 53. The casting is generally circular in outline, a portion of its outer periphery appearing in Fig. 1 where an outer shell 55 is broken away. Extending outwardly from the casting are pairs of radial ribs 55 and the fastening means 53 extends between the ribs of the pairs. The spaces 61 between the pairs of ribs and between the casting and the shell 55 are shown in Figs. 3 and 4. These spaces register with the passages 49. The cover 51 has openings 57 and passages therewithin to communicate with spaces 61. To the cover is secured a cap 60 by fastening means 62. It will be observed that the construction of the casting is such that two of the cover passages (at top and bottom) are in engagement with a blank face of the casting and are therefore inoperative, but that there are four spaces 61 operative to provide conduits from the cover opening to the fan.

Although not a part of this invention, there is shown a housing 63 to be supplied with oil by a pipe 65 from any suitable pump 64. This housing 63 is to constitute a control box for changing, by means of fluid pressure, the positions of the rollers 47 and therefore the ratio of the transmission. The fan is operable to draw air through openings 57, through spaces 61 around the transmission, then to force the air around the motor within its wall 8 and out through suitable openings such as 67 and 69. In this way both the transmission and motor are kept cool.

By securing the fan for rotation with the motor shaft a uniform rotation is secured. This is to be preferred for, were the fan carried by the driven shaft of the change speed unit, it would rotate too rapidly when the ratio of the transmission is in high and too low for efficient cooling when the transmission is set for low ratio. The location on the motor shaft therefore affords a better average cooling. The arrangement whereby the fan cools the motor as well as the transmission is desirable, particularly when the unit is operating with overload for any considerable length of time.

I claim:

A motor, a coaxial change speed transmission, a fan secured to the shaft of the motor, said transmission having a circular wall, circumferentially spaced pairs of radial ribs projecting therefrom, a shell surrounding said wall and engaging said ribs to form air spaces, an end cover having inlet passages communicating with said spaces, said motor having a surrounding wall and outlets whereby said fan rotates at motor speed and draws air from over said transmission and delivers it over said motor to said outlets.

THOMAS C. DELAVAL-CROW.